United States Patent
Katou et al.

(10) Patent No.: US 9,452,733 B2
(45) Date of Patent: Sep. 27, 2016

(54) VEHICLE-MOUNTED CONTROL SYSTEM AND VEHICLE-MOUNTED CONTROL DEVICE

(71) Applicant: DENSO CORPORATION, Kariya, Aichi-pref. (JP)

(72) Inventors: Fusayoshi Katou, Okazaki (JP); Yuzo Harata, Chiryu (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 14/394,181

(22) PCT Filed: Apr. 10, 2013

(86) PCT No.: PCT/JP2013/002437
§ 371 (c)(1),
(2) Date: Oct. 13, 2014

(87) PCT Pub. No.: WO2013/161202
PCT Pub. Date: Oct. 31, 2013

(65) Prior Publication Data
US 2015/0057840 A1    Feb. 26, 2015

(30) Foreign Application Priority Data
Apr. 23, 2012 (JP) .................................. 2012-098154

(51) Int. Cl.
*G05D 1/00* (2006.01)
*G05D 3/00* (2006.01)
(Continued)

(52) U.S. Cl.
CPC .............. *B60R 25/102* (2013.01); *B60R 25/24* (2013.01); *H04L 9/32* (2013.01); *H04W 12/12* (2013.01)

(58) Field of Classification Search
CPC ....... B60R 25/24; H04L 9/32; H04L 2209/80; H04L 2209/84; H04L 67/12; H04W 12/12
USPC ................. 701/2; 340/426.1, 426.12–426.16, 340/426.27–426.29; 455/414.3
See application file for complete search history.

(56) References Cited

U.S. PATENT DOCUMENTS 7,504,931 B2 * 3/2009 Nguyen ................ B60R 25/102
340/426.15
7,894,810 B2 * 2/2011 Feher ..................... H04M 3/382
340/5.72

(Continued)

FOREIGN PATENT DOCUMENTS

JP    2003025960 A    1/2003
JP    2004013534 A    1/2004
(Continued)

OTHER PUBLICATIONS

English_translation for Reference JP2004013534.*

(Continued)

*Primary Examiner* — Jerrah Edwards
*Assistant Examiner* — Rachid Bendidi
(74) *Attorney, Agent, or Firm* — Harness, Dickey & Pierce, P.L.C.

(57) ABSTRACT

A vehicle-mounted control system to prevent an execution of an improper request of a center apparatus is provided. The vehicle-mounted control system executes an impropriety determination process, which determines whether a center request signal is an improper signal, based on circumstance information representing a circumstance where a vehicle is placed. Accordingly, it may be possible to determine whether the center request signal is an improper signal transmitted by an operation of a center apparatus by an improper person. When it is determined as the improper center request signal (S2: No), a vehicle control based on the center request signal is not executed.

8 Claims, 3 Drawing Sheets

(51) Int. Cl.
*G06F 7/00* (2006.01)
*G06F 17/00* (2006.01)
*B60R 25/102* (2013.01)
*H04L 9/32* (2006.01)
*H04W 12/12* (2009.01)
*B60R 25/24* (2013.01)

(56) References Cited

U.S. PATENT DOCUMENTS

| | | | | |
|---|---|---|---|---|
| 7,999,654 | B2* | 8/2011 | Taki | B60R 25/2009 307/10.3 |
| 2005/0151630 | A1 | 7/2005 | Shimonomoto et al. | |
| 2006/0114100 | A1* | 6/2006 | Ghabra | E05B 81/78 340/5.61 |
| 2008/0214165 | A1 | 9/2008 | Matsumura et al. | |
| 2008/0266051 | A1* | 10/2008 | Taki | B60R 25/2009 340/5.1 |
| 2009/0096576 | A1* | 4/2009 | Oman | G07C 5/008 340/5.62 |
| 2011/0187513 | A1* | 8/2011 | Taki | B60R 25/2009 340/13.25 |
| 2011/0257817 | A1* | 10/2011 | Tieman | B60R 25/24 701/2 |
| 2011/0313595 | A1* | 12/2011 | Kato | E05B 19/0082 701/2 |
| 2012/0164989 | A1* | 6/2012 | Xiao | G07C 5/008 455/414.1 |
| 2013/0162421 | A1* | 6/2013 | Inaguma | H04B 5/0031 340/438 |
| 2013/0234827 | A1* | 9/2013 | Tomita | G08C 23/04 340/5.61 |
| 2013/0295912 | A1* | 11/2013 | Chen | H04W 4/00 455/420 |

FOREIGN PATENT DOCUMENTS

| | | | |
|---|---|---|---|
| JP | 2004013534 | A * | 1/2004 |
| JP | 2005088760 | A | 4/2005 |
| JP | 2005199759 | A | 7/2005 |
| JP | 2006021598 | A | 1/2006 |
| JP | 2006347292 | A | 12/2006 |
| JP | 4807356 | B2 | 11/2011 |
| JP | 2011229061 | A | 11/2011 |

OTHER PUBLICATIONS

International Search Report and Written Opinion (in Japanese with English Translation) for PCT/JP2013/002437, mailed Jul. 23, 2013; ISA/JP.

Office Action dated Jul. 14, 2015 in corresponding Japanese Application No. 2012-098154.

Office Action dated Dec. 21, 2015 issued in the corresponding CN application No. 2013 8002 1472.9 in Chinese with English translation.

\* cited by examiner

VEHICLE-MOUNTED CONTROL SYSTEM AND VEHICLE-MOUNTED CONTROL DEVICE

CROSS REFERENCE TO RELATED APPLICATIONS

This application is a U.S. National Phase Application under 35 U.S.C. 371 of International Application No. PCT/JP2013/002437 filed on Apr. 10, 2013 and published in Japanese as WO 2013/161 202 A1 on Oct. 31, 2013. This application is based on and claims the benefit of priority from Japanese Patent Application No. 2012-098154 filed on Apr. 23, 2012. The entire disclosures of all of the above applications are incorporated herein by reference.

TECHNICAL FIELD

The present disclosure relates to a vehicle-mounted control system and a vehicle-mounted control device, and especially relates to a vehicle-mounted control system and a vehicle-mounted control device operated by a remote instruction.

BACKGROUND ART

Various technologies for preventing an improper use of a vehicle are known. For example, in a theft prevention system for a vehicle in patent literature 1, an authentication required for an engine start is not successful when an ECU such as an ECU configuring an auto alarm system, an immobilizer ECU, or the like detects an impropriety action.

In addition, various technologies operating a vehicle by a remote control are proposed recently. As the remote control, a technology is known that, not only a user controls the vehicle near the vehicle, but also a center apparatus that is remote from the vehicle transmits various control signals to the vehicle. A technology is also known that, when a vehicle theft is detected, the vehicle automatically notifies the center apparatus.

PRIOR ART DOCUMENT

Patent Document

Patent Literature 1: JP-A-2006-21598

SUMMARY OF THE INVENTION

The inventors of the present application have found the following with respect to a technology that a center apparatus transmits a control signal to a vehicle.

It may be considered that various vehicle controls are performed by transmitting a request signal to a vehicle from a center apparatus. So that the center apparatus performs a remote control of the vehicle and prevents an improper use of the vehicle beyond at the time of a vehicle theft, it may be considered that a request signal from the center apparatus is set to perform most preferentially. However, a center apparatus may be used improperly in a case where the center is taken over or the like.

A technology in patent literature 1 is a technology to cope with a vehicle theft, and the technology in patent literature 1 may not cope with an improper use of the center apparatus. That is, even when the center apparatus is used improperly, when a request signal from the center apparatus is a regular signal, the technology in patent literature 1 cannot determine as an improper use.

As described in patent literature 1, at the time of the vehicle theft, an authentication between a vehicle-mounted device and an apparatus that a theft person possesses may be successful by change of an authentication code, or the like. Therefore, it may be considered that a priority level of the request signal of the center apparatus is made higher than a priority level of a signal from a portable apparatus of a regular user. In addition, it is not limited to this example, and it may be considered that the priority level of the center request signal is made higher than the priority level of the user request signal according to a control content or a vehicle state.

When the priority level of the request signal of the center apparatus is made higher than the priority level of the signal from the portable apparatus of the regular user, the center is used improperly, and a vehicle performs an unsuitable operation such as an overrun or the like due to the request signal of the center apparatus, even the regular user may not stop the unsuitable operation.

It is an object of the present disclosure to provide a vehicle-mounted control system controlling an execution of an unsuitable request of a center apparatus, and it is another object of the present disclosure to provide a vehicle-mounted control system that an regular user of a vehicle stops an unsuitable vehicle operation due to an improper use of the center apparatus.

According to a first example of the present disclosure, a vehicle-mounted control system includes a center request receiver receiving a center request signal transmitted from a center apparatus placed outside a vehicle to request a predetermined control to a vehicle, and a control execution portion executing a vehicle control based on the center request signal received by the center request receiver. The vehicle-mounted control system includes an impropriety determination portion that determines whether the center request signal transmitted from the center apparatus is an improper signal transmitted by an operation of the center apparatus by an improper person, based on a circumstance information representing a circumstance where the vehicle is placed. The control execution portion does not execute a vehicle control based on the center request signal when the impropriety determination portion determines that the center request signal transmitted from the center apparatus is an improper center request signal, When the center apparatus is operated improperly, and the center request signal itself is a regular signal, a conventional system may execute the center request signal. Thus, when the center apparatus is operated improperly, and the center request signal includes contents which the center apparatus originally should not instruct, an operation (for example, an overrun, a blowing of an alarm sound, or the like) according to the signal may be performed.

On the contrary, according to the vehicle-mounted control system of the present disclosure, since the impropriety determination portion that determines whether the center request signal is an improper signal based on the circumstance information representing a circumstance where the vehicle is placed is included, it is possible to determine whether the center request signal is an improper signal transmitted that the center apparatus is operated by an improper person. When the vehicle-mounted control system determines that the center request signal is improper, the vehicle-mounted control system does not execute a vehicle control based on the center request signal, and therefore, it is possible to prevent an execution of an improper request of the center apparatus.

In addition, according to the second example of the present disclosure, the vehicle-mounted control system includes a center request receiver receiving the center request signal transmitted from the center apparatus placed outside the vehicle to request a predetermined control to the vehicle, a user request receiver receiving a user request signal transmitted from a portable apparatus carried by a user of the vehicle to perform a remote control of the vehicle, and a control execution portion executing a vehicle control based on the center request signal and the user request signal received by the center request receiver and the user request receiver. The vehicle-mounted control system includes an authentication portion performing an authentication whether a person carrying the portable apparatus is a regular user of the vehicle, and a priority level change portion that makes the priority level of the user request signal higher than the priority level of the center request signal when the authentication portion authenticates that the person carrying the portable apparatus is a regular user. The control execution portion receives the center request signal and the user request signal, and the control execution portion executes a control with a higher priority level of the center request signal and the user request signal when control contents of the received center request signal and the received user request signal are conflicted.

According to the vehicle-mounted control system, even when the priority level of the center request signal is set higher than the priority level of the user request signal, the priority level of the user request signal is made higher than the priority level of the center request signal when the authentication portion authenticates the regular user. Therefore, when the regular user of the vehicle determines that the operation of the vehicle according to the center request signal is unsuitable, the regular user performs an authentication by the authentication portion, and transmits the user request signal to stop the operation of the vehicle according to the center request signal. It is possible to stop the unsuitable operation of the vehicle.

BRIEF DESCRIPTION OF THE DRAWINGS

The above and other objects, features and advantages of the present disclosure will become more apparent from the following detailed description made with reference to the accompanying drawings. In the drawings.

PREFERRED EMBODIMENTS FOR CARRYING OUT THE INVENTION

First Embodiment

Figure 1:
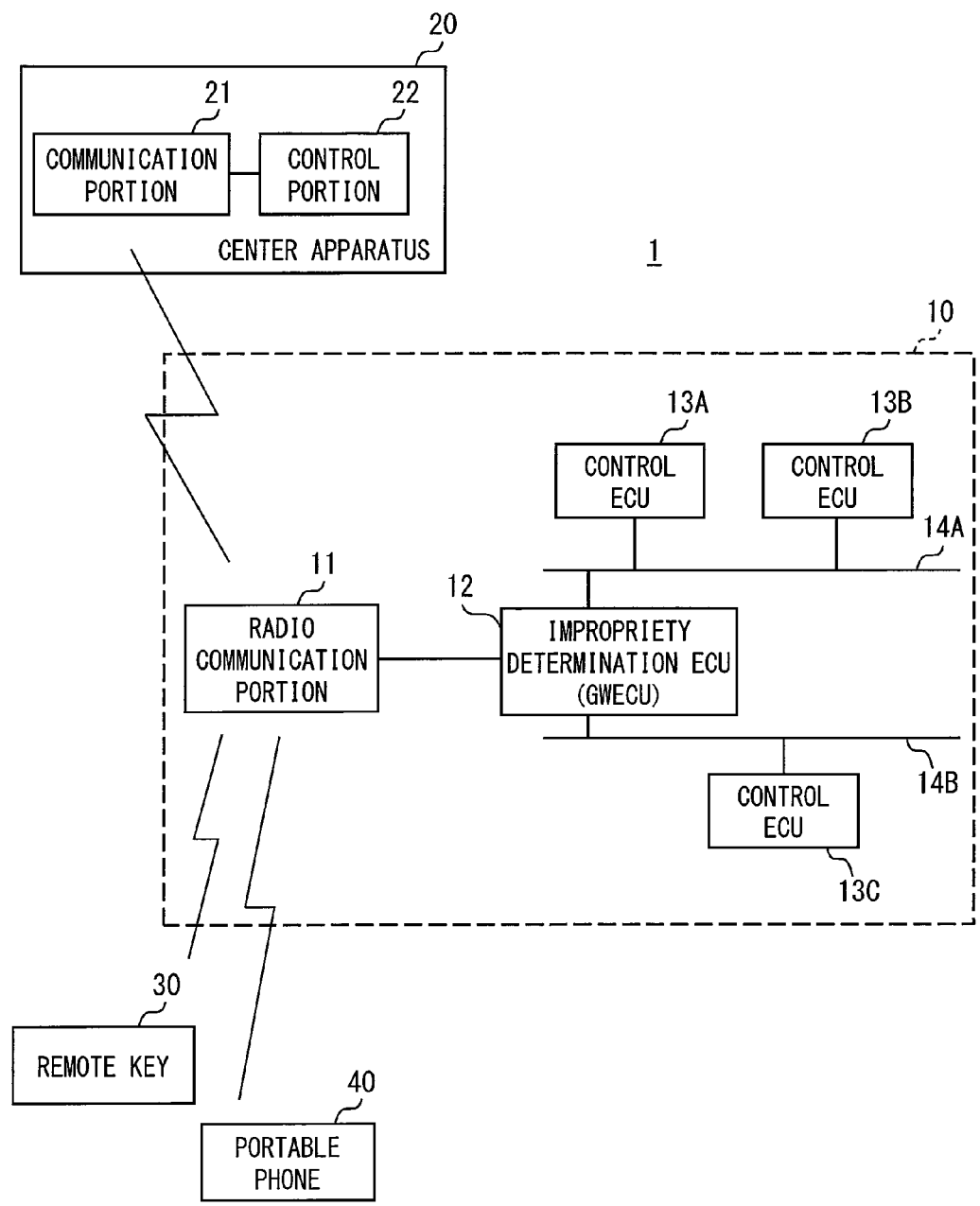
FIG. 1 is a block diagram illustrating a configuration of a vehicle remote control system 1 including a vehicle-mounted control system 10 according to an embodiment of the present disclosure.

Following, embodiments of the present disclosure will be described based on the drawings. A vehicle remote control system 1 described in FIG. 1 includes a vehicle-mounted control system 10 mounted to a vehicle, a center apparatus 20 placed to a service center, a remote key 30 carried by a user, and a portable phone 40 carried by the user.

The center apparatus 20 includes a communication portion 21 performing a wireless communication with a radio communication portion 11 of the vehicle-mounted control system 10, and a control portion 22 that controls the communication portion 21 to transmit a center request signal to the vehicle. The center request signal requests a control of a vehicle-mounted apparatus to the control ECU 13 of the vehicle-mounted control system 10.

The remote key 30 transmits a request signal (hereinafter, referred to as a user request signal) that requests various operations by a short range radio communication to the radio communication portion 11 of the vehicle-mounted control system 10.

The portable phone 40 is carried by the user of the vehicle, and the ID of the portable phone 40 is registered by a user operation into a predetermined memory portion of the vehicle-mounted control system 10 as an ID of a portable phone that the regular user carries. Incidentally, the memory portion registering the ID may be any kind of memory portions referred by the impropriety determination ECU 12. For example, the ID is stored in the memory portion provided to the inside of the impropriety determination ECU 12.

The vehicle-mounted control system 10 includes the radio communication portion 11, the impropriety determination ECU 12, a control ECU 13 that controls various not-shown vehicle-mounted apparatuses, and a bus 14 corresponding to a communication line.

The radio communication portion 11 includes a wide area communication function that is communicable with the communication portion 21 of the center apparatus 20 and the portable phone 40, and a short range communication function that is communicable with the remote key 30. The radio communication portion 11 functions as a center request receiver and a user request receiver. The radio communication portion 11 receives the center request signal transmitted by the center apparatus 20 and the user request signal transmitted by the remote key 30.

The impropriety determination ECU 12 is also a gateway ECU (hereinafter, referred to as a GWECU), and connects two buses 14A, 14B mutually. The control ECUs 13A, 13B are connected to the bus 14A, and the control ECU 13C is connected to the bus 14B. Incidentally, the multiple ECUs 13A to 13C are simply described as a control ECU 13 when the multiple control ECUs 13A to 13C are not especially distinguished. In addition, with respect to the two buses 14A, 14B, the two buses 14A, 14B are simply described as a bus 14 when the buses 14A, 14B are not distinguished. The number of the control ECU 13 and the number of the bus 14 included in the vehicle-mounted control system 10 is not limited to the described number, and the vehicle-mounted control system 10 may include more controls 13 and more buses 14 than the present embodiment.

The control ECU 13 executes, based on the center request signal and the user request signal, a door lock/unlock, a blow/stop of a security alarm, a set/release of an immobilizer, a start/stop of an engine, a turning on/off of an air conditioner, a window open/close by a power window operation, or the like.

The impropriety determination ECU 12 obtains the center request signal from the radio communication portion 11 when the radio communication portion 11 receives the center request signal. In addition, the impropriety determination ECU 12 obtains a circumstance information in which the vehicle mounted to the vehicle-mounted control system 10 is placed, and the impropriety determination ECU 12 performs an impropriety determination process in which it is determined whether the center request signal is an improper signal transmitted by an operation of the center apparatus 20 by an improper person. The circumstance information used in the determination is obtained from the control ECU 13, other vehicle-mounted apparatuses, other sensors, or the like through the bus 14.

The circumstance information includes information of time and location. In addition to the information of time and location, the circumstance information may include information of objects existing around the vehicle, the information being that there are many people around the vehicle, there is a building around the periphery, and the vehicle exists within doors like a garage. Incidentally, since the information of objects existing around the vehicle depends on the vehicle location, the information of the location may be considered broadly and the information of objects may be considered as the information of the location.

The impropriety determination process based on the circumstance information is a determination performed based on a viewpoint that it is not preferred to perform a control according to the center request signal in the present status even when there is the center request signal, or a viewpoint that the center request signal should not be transmitted in a present status. In order to be used in the determination, a corresponding relation between a control contents determined as an impropriety and a circumstance is stored in the predetermined memory portion in advance Incidentally, a specific parameter of the circumstance information regulated by the corresponding relation may be one kind of a parameter, or may be multiple kinds of parameters.

Specific examples of the above corresponding relation are the following (1) to (4) cases, for example.

(1)

When the circumstance is a shopping quarters and the period of time that there are many people, it is determined that the center request signal of "alarm sound blowing" is improper. An alarm sound is troublesome when the circumstance is in a shopping quarters and there are many people. In addition, it is hard to consider a theft since there are many people. Incidentally, it is set in advance in a map information whether the location corresponds to a shopping quarters or not, and it is determined whether the vehicle is in the shopping quarters based on the map information and a present location of the vehicle. A period of time that there are many people is also set in advance.

(2)

When the vehicle exists within doors, it is determined that the center request signal of "an engine start" is improper. Since exhaust gas is filled inside when an engine is started within doors, it is hard to consider that this kind of the center request signal is generated usually. Incidentally, similar to a case (1), it is determined whether the vehicle exists within doors based on the map information and the present location information of the vehicle.

(3)

When the period of time is midnight or early morning, it is determined that the center request signal of "an engine start" is improper. Although a user may drive the vehicle at this period of time, the user may use the remote key 30 in this case. It is considered that the center request signal of "the engine start" is not generated at this period of time usually.

(4)

When the vehicle is in transport, it is determined that the center request signal of "an engine start" is improper. When the vehicle is in transport, the vehicle cannot travel even when the engine is started. It is determined to be improper in a case where the engine start is requested irrespective of this situation. Incidentally, it is determined whether the vehicle is in transport based on a state where the vehicle is in a non-traveling state such an engine off, a vehicle speed of zero, or the like, and a present location is successively moved.

The cases (1) to (4) are examples, and a corresponding relation other than the cases may be stored. The corresponding relations of the cases (1) to (4) are not necessary.

The impropriety determination ECU 12 corresponds to the GWECU as described above, and the impropriety determination ECU 12 stores a corresponding relation between a control represented by the center request signal and the control ECU 13 executing the control. When the impropriety determination ECU 12 obtains the center request signal from the radio communication portion 11, and it is not determined that the center request signal is improper, the impropriety determination ECU 12 transmits the center request signal to the bus 14, which is connected with the control ECU 13 that executes a control represented by the center request signal.

On the contrary, when it is determined that the center request signal is improper, the center request signal is not transmitted to the bus 14. Thus, when the impropriety determination ECU 12 determines that the center request signal is an improper signal, the control ECU 13 does not execute a vehicle control based on the center request signal.

The radio communication portion 11 also receives the user request signal transmitted by the remote key 30 as described above. The impropriety determination ECU 12 obtains the user request signal from the radio communication portion 11 also when the radio communication portion 11 receives the user request signal. When the obtained signal is the user request signal, the impropriety determination process is not performed. The impropriety determination ECU 12 transmits the user request signal to the bus 14, which is connected with the control ECU 13 executing a control represented by the obtained user request signal.

In the present embodiment, a control is executed based on the two kinds of signals of the center request signal and the user request signal. However, it may be considered that request contents of the center request signal and the user request signal mutually conflict.

Thus, in the present embodiment, a priority level representing which of the center request signal and the user request signal has priority is determined by the control contents. Incidentally, the priority level may be determined by a vehicle state in addition to the control contents. For example, the user request signal usually has priority with respect to the engine start and stop. However, when a vehicle theft is detected, the center request signal may have priority.

In addition, in the present embodiment, even when the center request signal has a high priority level with respect to a control, when an authentication is successful as a regular user, the priority level is changed and the user request signal has a high priority level.

Figure 2:
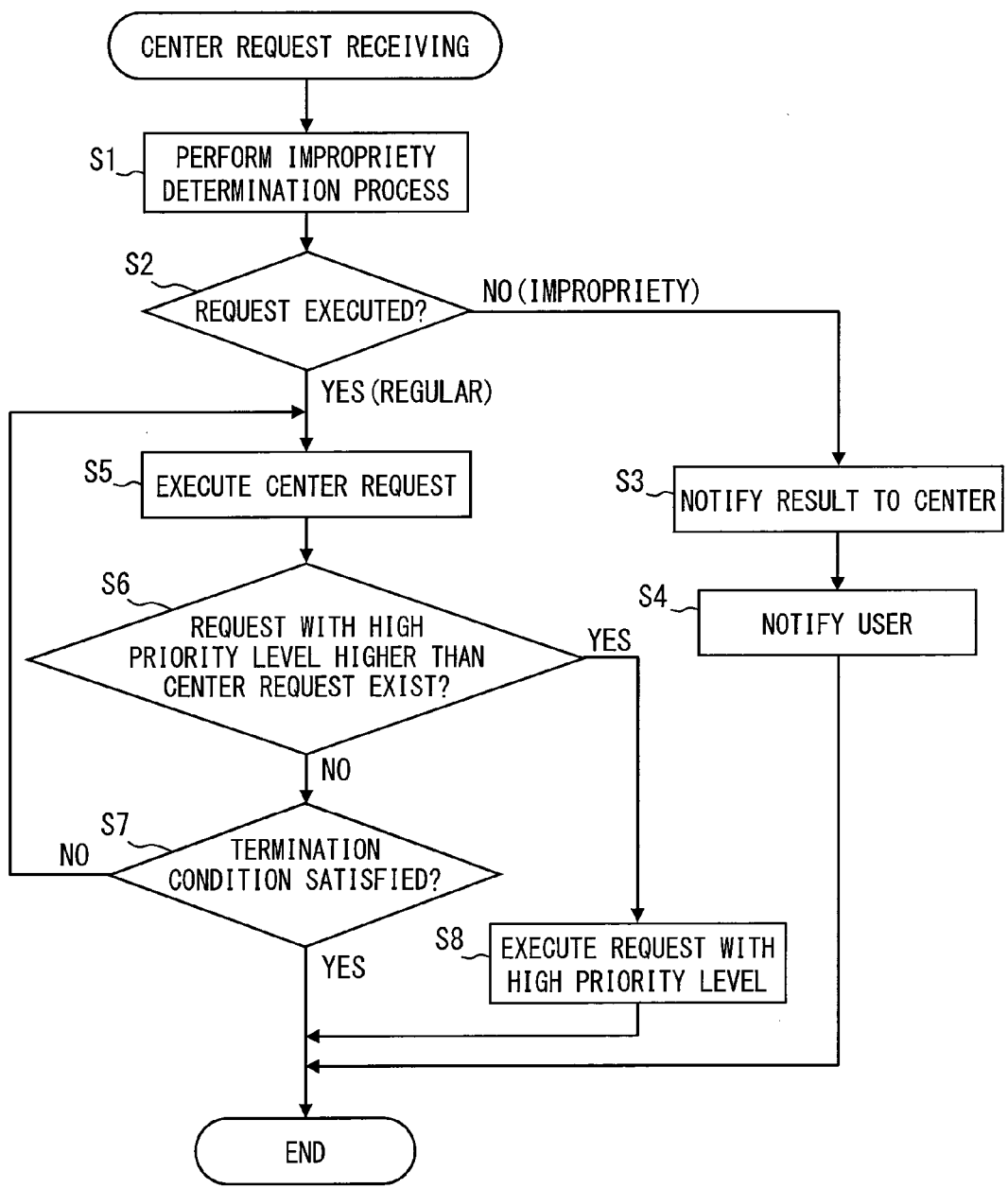
FIG. 2 is a flowchart illustrating a process performed when an impropriety determination ECU 12 obtains a center request signal.
Figure 3:
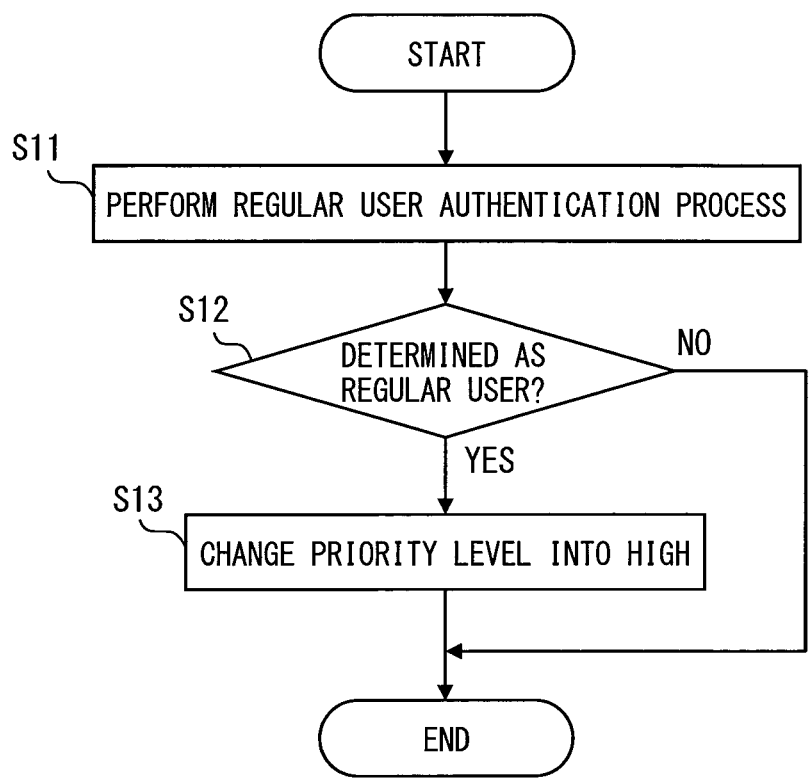
FIG. 3 is a flowchart illustrating a priority level change process executed in parallel with FIG. 2.

The process executed by the impropriety determination ECU 12 is explained with referring to flowcharts in FIG. 2 and FIG. 3.

The process described in FIG. 2 starts when the impropriety determination ECU 12 obtains the center request signal from the radio communication portion 11. At step S1, the above impropriety determination process is executed. Followingly, at step S2, it is determined whether a request represented by the center request signal is executed. When it is determined to be improper at step S1, it is determined as No at step S2 and the process proceeds to step S3. At step S3, a determination result of an impropriety is transmitted from the radio communication portion 11 to the communication portion 21 of the center apparatus 20. Followingly, at step S4, the user is notified of the determination result of the impropriety. A notification method to the user is set in advance, and for example, a registered portable phone 40 receives the message. As a more simple method, a display apparatus provided to a position visible from the outside of the vehicle may indicate the impropriety by turning on a lamp, blinking the lamp, or the like. When step S4 is executed, the process in FIG. 2 ends.

The explanation will go back to the determination of the step S2. When it is not determined to be improper at step S1, it is determined as Yes at and the process proceeds to step S5. At step S5, the center request is executed. That is, the GWECU 12 specifies the control ECU 13 executing the control based on the control content represented by the center request signal, and transmits the center request signal to the bus 14 to which the control ECU 13 is connected. Accordingly, the control ECU 13 executing the center request signal receives the center request signal, and executes a predetermined control.

At the following step S6, it is determined whether a request having a priority level higher than the center request exists or not. As described above, in the present embodiment, a priority level is determined by the control contents. According to the control contents, the user request signal has a high priority level initially. When the center request signal has the high priority level in an initial setting, and the user authentication is successful, the priority level of the user request signal is changed to high. The process in which the priority level is changed will be described below.

The determination at step S6 is performed by each control content. When both of the center request signal and the user request signal are received, controls according to the both request signals are executable, the both of the controls are performed. Therefore, the determination at step S6 determines whether the user request signal indicating a control conflicting with an executing control is received and whether the priority level of the user request signal is higher than the priority level of the center request level while executing the control according to the center request signal. When it is determined as No, the process proceeds to step S7.

At step S7, it is determined whether a predetermined termination condition is successful. The termination condition, for example, includes a receiving of a signal indicating a control termination from the center apparatus 20. The termination condition, for example, includes a condition that, when a condition of a vehicle state for executing a control with respect to the control is in an execution, the vehicle state does not satisfies the condition, a timeout, or the like.

When it is determined as No at step S7, the process returns to step S5. The control represented by the center request signal is continued. On the contrary, when it is determined as Yes at step S7, the process in FIG. 2 ends.

The explanation will go back to the determination at step S6. When the user request signal having a priority level higher than the priority level of the center request exists, it is determined as Yes at step S6, the process proceeds to step S8. At step S8, instead of the executing control contents, the control represented by the user request signal having a high priority level is executed. After executing step S8, the process described in FIG. 2 ends. Incidentally, while the control represented by the user request signal is executed, a determination of a termination condition is performed, the determination being similar with step S7. The control represented by the user request signal ends when the termination condition is successful.

Followingly, a priority level change process described in FIG. 3 will be explained. The process of FIG. 3 is executed with the process described in FIG. 2 by the impropriety determination ECU 12 in parallel. At step S11, a regular user authentication process is executed. The regular user authentication process authenticates whether the person carrying the remote key 30 is a regular user of a vehicle. It is postulated that the remote key 30 is communicable in the regular user authentication process. When the person is authenticated as a regular user by another configuration (means) other than this, the person carrying the remote key 30 is determined as the regular user. In the present embodiment, when an ID is obtained from the portable phone 40 and the obtained ID is matched with an ID of the regular user stored in advance, the person carrying the remote key 30 is determined as the regular user.

At step S12, it is determined whether the person has been determined as the regular user at step S11. When it is not determined as the regular user, the process in FIG. 3 ends. On the contrary, it is determined as the regular user, the process proceeds to step S13.

At step S13, with respect to all the control contents in which the center request signal has the high priority level, the priority level of the user request signal is changed to high. After executing step S13, when the user request signal is transmitted from the remote key 30, step S6 in FIG. 2 corresponds to Yes, and the control based on the user request signal will be performed.

Therefore, when the center apparatus 20 is used improperly, an unsuitable center request signal is transmitted, the impropriety determination process (S1) does not determines as an impropriety, and the center request signal has a high priority level, it may be possible that the regular user stops the control following the center request signal as described below. Thus, the priority level of the user request signal is made high through the regular user authentication process (S11), and then, the user request signal is transmitted, so that it is possible to stop the control following the center request signal.

As described above, according to the present embodiment, based on circumstance information representing a circumstance where the vehicle is placed, the impropriety determination process (S1) determining is executed to determine whether the center request signal is an impropriety signal. Accordingly, it is possible to determine whether the center request signal is an improper signal transmitted by an operation of the center apparatus 20 by the improper person. When it is determined as the improper center request signal (S2: No), the vehicle control based on the center request signal is not executed, and it is possible to prevent an execution of an improper request of the center apparatus 20.

In addition, in the present embodiment, even when the priority level of the center request signal is set higher than the priority level of the user request signal, when the regular user is authenticated at the regular user authentication process (S11), the priority level of the user request signal is changed to the priority level higher than the priority level of the center request signal (S12, S13). Therefore, when the regular user of the vehicle determines that then operation of the vehicle according to the center request signal is improper, the regular user perform the authentication by the regular user authentication process (S11) and transmits the use request signal for stopping the operation of the vehicle according to the center request signal. It is possible to stop the improper operation of the vehicle.

In addition, in the present embodiment, one impropriety determination ECU 12 determines whether the center request signal is an improper signal together. Therefore, only the impropriety determination ECU 12 stores the impropriety determination process (S1). Therefore, it is possible to configure the vehicle-mounted control system 10 with a small change as compared with a conventional vehicle-mounted system.

Incidentally, in the present embodiment, the control ECU 13 controlling the vehicle-mounted apparatus corresponds to an example of a control execution portion (a control execution means). In addition, the impropriety determination ECU 12 executing the impropriety determination process at step S1 corresponds to an example of an impropriety determination portion (an impropriety determination means). In addition, the impropriety determination ECU 12 executing the regular user authentication process at step S11 corresponds to an example of an authentication portion (an authentication means). In addition, the impropriety determination ECU 12 executing the processes at step S12 and step S13 corresponds to an example of a priority level change portion (a priority level change means). In addition, the impropriety determination ECU 12 executing the process at step S4 corresponds to an example of a notification portion (a notification means).

As described above, an embodiment according to the present disclosure is exemplified. However, embodiments of the present disclosure are not limited to the above described embodiment, and include the following embodiment. Furthermore, various modified embodiments without departing from a scope of the present disclosure are also included in the embodiment of the present disclosure in addition to the following embodiments.

First Modification

In the above embodiment, the impropriety determination ECU 12 determines whether the center request signal is an improper signal together. Each control ECU 13 may determine whether each center request signal is an improper signal, for example.

Second Modification

In addition, in the above embodiment, the authentication of the regular user is performed by the ID of the portable phone 40. The authentication is not limited not this, and the authentication of the regular user may be performed by various personal authentication means. In the authentication, it is not limited to an aspect that a specific hardware is carried by a user. For example, the authentication may be performed by a specific operation (e.g. a door handle is pulled while a door open operation of the remote key 30 is performed) such as a vehicle operation in a specific aspect registered in advance, or the like. In addition, an regular user may be authenticated when a spare remote key is communicated in addition to the remote key 30, In addition, a dedicated communication device for a priority level change may be provided. In addition, the regular user may be authenticated by a biometric authentication.

The invention claimed is:

1. A control system mounted on a vehicle, the control system comprising:
    a control ECU;
    at least one receiver mounted in the vehicle;
    a center request receiving portion of the at least one receiver receiving a center request signal transmitted from a center apparatus placed outside of the vehicle, the center request signal requesting control of a vehicle mounted apparatus;
    a control execution portion of the control ECU executing the control of the vehicle mounted apparatus based on the center request signal received by the center request receiver; and
    an impropriety determination ECU determining whether the center request signal transmitted by the center apparatus is an improper signal transmitted by an operation of the center apparatus by an improper person, based on information representing a circumstance where the vehicle is placed, wherein
    the control execution portion does not execute the control of the vehicle mounted apparatus based on the center request signal when the impropriety determination ECU determines that the center request signal transmitted from the center apparatus is an improper center request signal; and the control system further comprises:
    a user request portion of the at least one receiver receiving a user request signal transmitted from a portable apparatus carried by a user of the vehicle, the user request signal requesting remote control of the vehicle;
    an authentication portion of the impropriety determination ECU authenticating whether the user carrying the portable apparatus is a regular user of the vehicle; and
    a priority level change portion of the impropriety determination ECU making a priority level of the user request signal higher than a priority level of the center request signal when the authentication portion authenticates that the user carrying the portable apparatus is the regular user, wherein
    the control execution portion executes a control having a higher priority level of the center request signal and the user request signal when the control execution portion receives the center request signal and the user request signal, and control contents requested by the center request signal and the user request signal mutually conflict.

2. The vehicle-mounted control system according to claim 1, wherein
    the impropriety determination ECU uses at least one of location information of the vehicle and time information as the circumstance information.

3. The vehicle-mounted control system according to claim 1, comprising
    a notification portion notifying a user of the vehicle of a determination result when the impropriety determination ECU determines that the center request signal corresponds to the improper center request signal.

4. The vehicle-mounted control system according to claim 1, wherein
    the control execution portion is configured from a plurality of ECUs, and
    the impropriety determination ECU is provided with one ECU, which is connected to the plurality of ECUs configuring the control execution portion.

5. A control system mounted on a vehicle, the control system comprising:

a control ECU;

at least one receiver mounted in the vehicle;

a center request receiving portion of the at least one receiver receiving a center request signal transmitted from a center apparatus placed outside of the vehicle, the center request signal requesting control of a vehicle mounted apparatus;

a user request receiving portion of the at least one receiver receiving a user request signal transmitted from a portable apparatus carried by a user of the vehicle, the user request signal requesting a remote control of the vehicle;

a control execution portion of the control ECU executing a vehicle control based on the center request signal and the user request signal received by the center request receiver and the user request receiver;

an authentication portion of the impropriety determination ECU authenticating whether the user carrying the portable apparatus is a regular user of the vehicle; and a priority level change portion of the impropriety determination ECU being made a priority level of the user request signal higher than the priority level of the center request signal when the authentication portion authenticates that the user carrying the portable apparatus is the regular user, wherein the control execution portion executes a control having a higher priority level of the center request signal and the user request signal when the control execution portion receives the center request signal and the user request signal, and control contents requested by the center request signal and the user request signal mutually conflict.

6. A vehicle-mounted control device comprising an impropriety determination ECU determining whether a center request signal transmitted by a center apparatus is an improper signal transmitted by an operation of the center apparatus by an improper person, based on circumstance information representing a circumstance where a vehicle is placed;

an authentication portion of the impropriety determination ECU authenticating whether a user carrying a portable apparatus is a regular user of the vehicle; and a priority level change portion of the impropriety determination ECU making a priority level of a user request signal transmitted from the portable apparatus higher than a priority level of the center request signal when the authentication portion authenticates that the user carrying the portable apparatus is the regular user.

7. The vehicle-mounted control device according to claim 6, wherein the vehicle-mounted control device functions as a gateway ECU connected to a plurality of control execution portions executing a vehicle control based on the center request signal through a communication line.

8. The vehicle-mounted control device according to claim 6, further comprising:

a notification portion notifying the user of the vehicle of a determination result when the impropriety determination ECU determines that the center request signal corresponds to an improper center request signal.

\* \* \* \* \*